Figure 1:
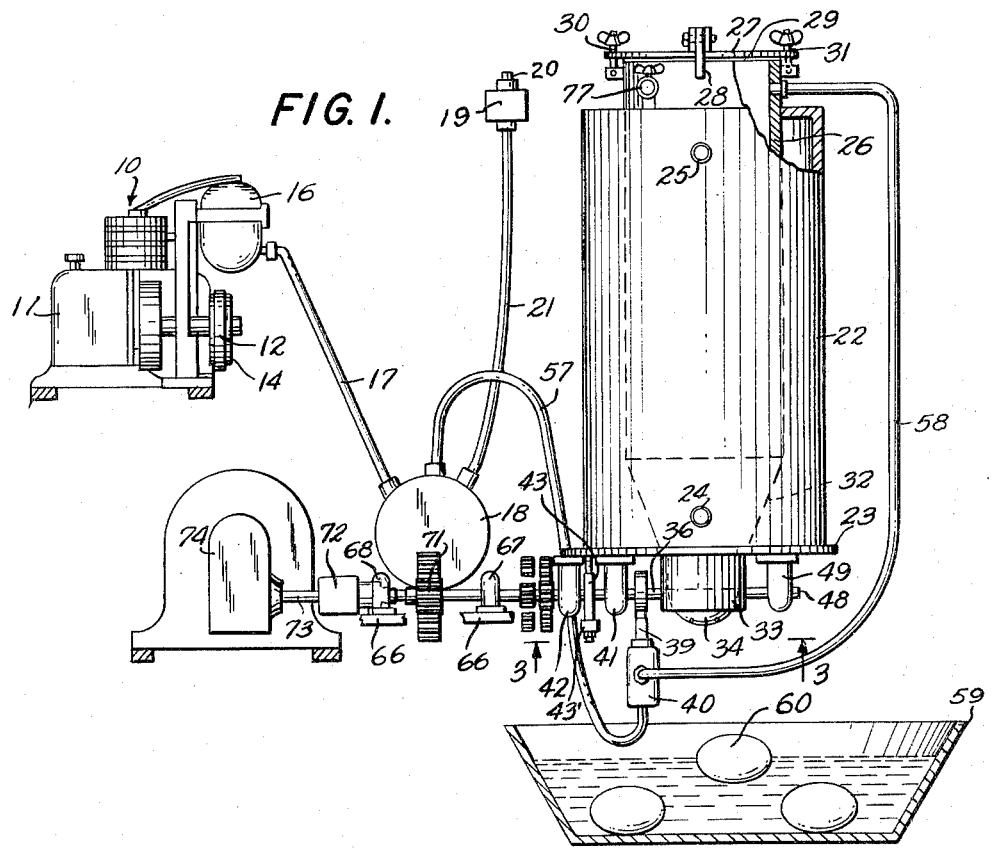

Aug. 27, 1957 A. A. MONGIELLO ET AL 2,803,878
MACHINE FOR FORMING CHEESE BALLS OF UNIFORM WEIGHT AND SHAPE
Filed Oct. 7, 1955 2 Sheets-Sheet 1

INVENTOR.
ANGELO A. MONGIELLO
AND ZACHARIAS BILOUS
BY
L. S. Saulsbury
ATTORNEY

Aug. 27, 1957  A. A. MONGIELLO ET AL  2,803,878
MACHINE FOR FORMING CHEESE BALLS OF UNIFORM WEIGHT AND SHAPE
Filed Oct. 7, 1955  2 Sheets-Sheet 2
FIG. 2.
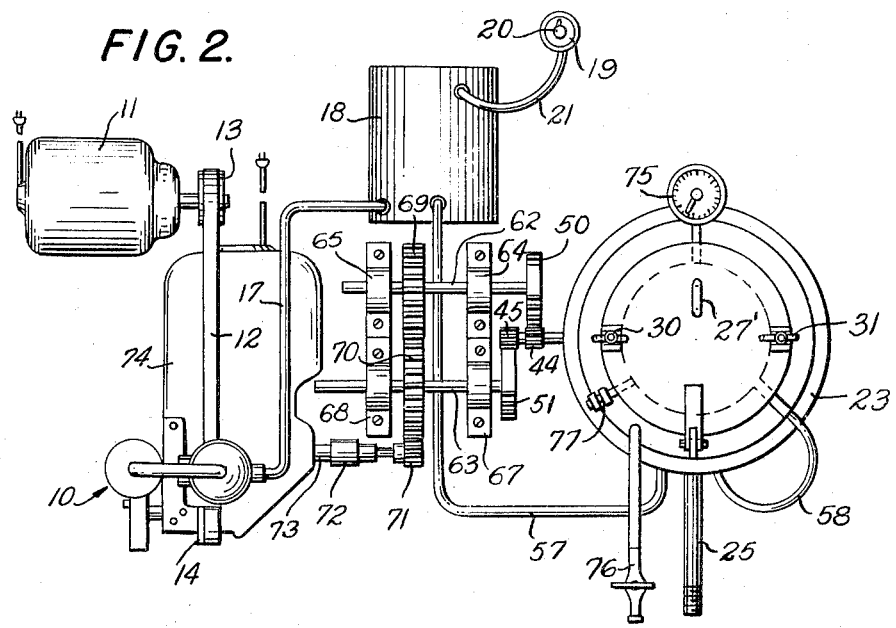
FIG. 6.
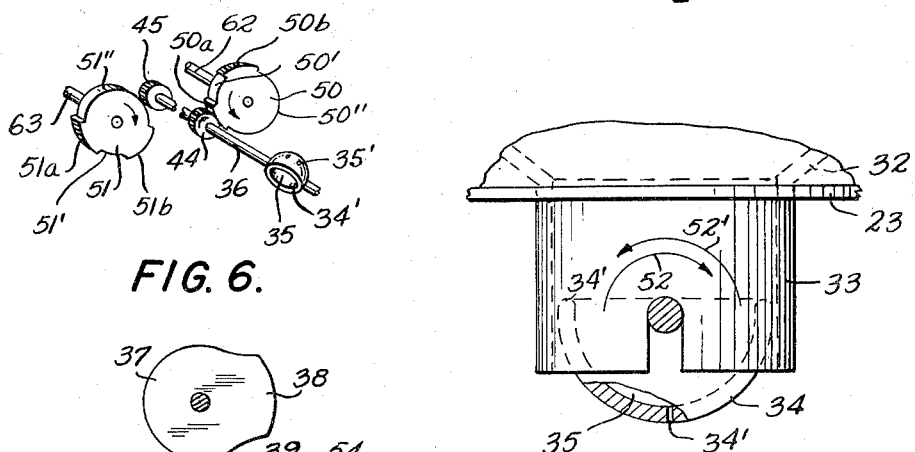
FIG. 4.
FIG. 5.
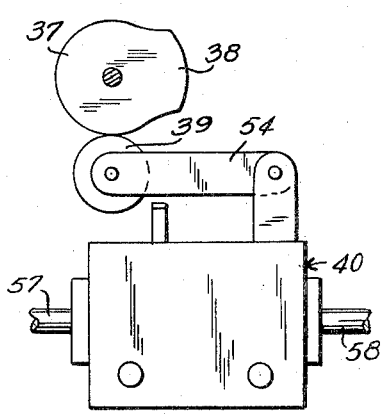
INVENTOR.
ANGELO A. MONGIELLO
AND ZACHARIAS BILOUS
BY
L. S. Saulsbury
ATTORNEY

United States Patent Office 2,803,878
Patented Aug. 27, 1957

2,803,878

MACHINE FOR FORMING CHEESE BALLS OF UNIFORM WEIGHT AND SHAPE

Angelo A. Mongiello and Zacharias Bilous, Brooklyn, N. Y.; said Bilous assignor to said Mongiello Application October 7, 1955, Serial No. 539,140

6 Claims. (Cl. 31—7)

This invention relates to a machine for forming cheese balls of uniform weight and shape.

Cheese balls of mozzarella cheese have been difficult to form so as to have uniform shape and weight when done by hand. The forming of these cheese balls by hand has been a long, tedious and very costly operation because the cheese ball ends must be made free of openings so that no air or brine in which the balls are cured may enter the same. Molds have been found to be impractical in overcoming the closing of ends of the balls and at the same time keeping the weight uniform and the production high. Mozzarella cheese is of putty, clay or taffy-like and almost of rubber-like consistency and is difficult to shape by packing into a mold without having to turn portions of the same upon themselves and producing undesirable layers which do not adhere together thus resulting in a non-homogeneous ball. The amount of waste of cheese when reckoned from the use of molds has been great on short runs. Furthermore, the making of these cheese balls by hand is wholly unsanitary as the cheese must be handled every time a ball of cheese is formed.

It is the principal object of the present invention to provide a machine which will form uniform shaped and nonwrinkled cheese balls and eliminate the need to form them by hand and the tedious costly labor operations inherent with hand methods and thereby the manufacturer can operate on a more profitable basis.

It is another and important object of the invention to provide a machine for shaping cheese balls which can be set to produce either the minimum desired weight for a particular size of cheese ball or wherein the maximum weight can be controlled by a simple adjustment of the machine so that an actual weighing operation need not have to be effected to meet the requirements of weights and measures of the food authorities.

It is still another object of the invention to provide a machine for making cheese balls wherein the balls are formed by the machine without need of handling the cheese mass except for filling with the mass to be processed and from which the balls are taken one at a time and wherein upon the depositing of the cheese mass into a hopper and applying pressure to the mass to project the same into a cutting mold the cheese shapes will be automatically taken from the mass and dropped into a vessel containing cold water to congeal them without the cheese having to be worked or portions cut therefrom to finally shape the cheese ball of the desired weight.

It is still another object of the invention to not only produce these cheese balls by machine but to produce cheese balls which will be of uniform size and shape and such that they can be quickly and more easily placed in the plastic bags of a restricted diameter by a few people and in less time than is required for irregular shaped hand made balls and thereby to make their labor available for other duties in the handling of the daily cheese batch run.

Other objects of the invention are to provide an apparatus for forming cheese balls which is of simple construction, inexpensive to manufacture, has a minimum number of parts, easy to control, can be confined to a small area of floor space, will have low maintenance, be more sanitary, automatic in operation, easy to adjust for different weight consistencies, positive and efficient in operation.

Figure 3:
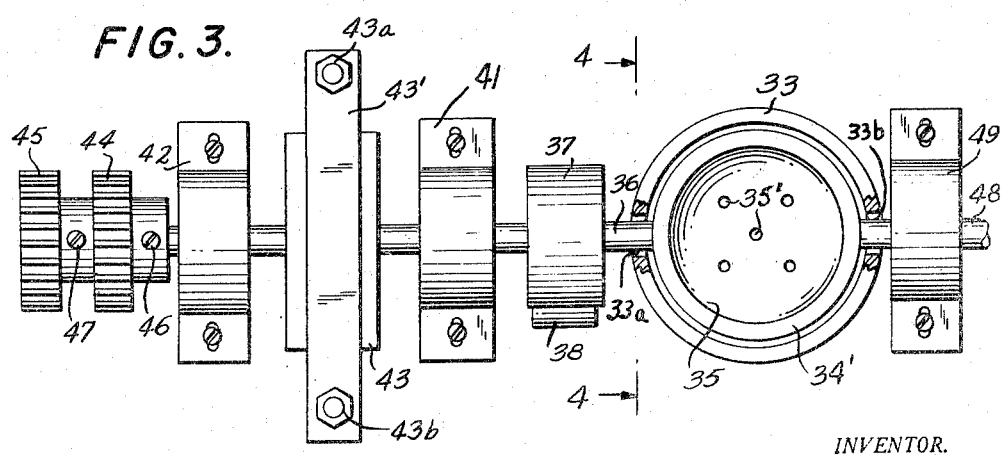

For other objects and for a better understanding of the invention, reference may be had to the following detailed description taken in connection with the accompanying drawing, in which Figure 1 is a skeletonized elevational view of the operating parts of the machine set apart from the supporting frame, Fig. 2 is a skeletonized top plan view of the parts of the machine shown in Fig. 1, Fig. 3 is an enlarged bottom plan view of the lower discharge end of the cheese hopper and looking into the open space of the semi-spherical cutting mold, upon the bearing elements supporting the driving shaft for the cutting mold, the cam, the friction brake and the driving gears, the view being taken generally looking upwardly upon line 3—3 of Fig. 1.

Fig. 4 is an enlarged elevational view of the lower end of the discharge hopper with the severing or cutting mold turned to receive a charge of the cheese, and portion of the mold cut away to show the interior thereof, Fig. 5 is an enlarged side elevational view of the cam operated compressed air valve for controlling the delivery of the air to the hopper to charge the severing or cutting mold, and Fig. 6 is a fragmentary perspective view in a reduced scale of the driving gear and the cutting mold shaft turned thereby.

Referring now particularly to Figs. 1 and 2, there is shown an air compressor pump 10 driven by an electric motor 11 through a V-belt 12 connected between a pulley 13 on the motor and a driven pulley 14 on the pump. Associated with the pump is an air dome 16 from which air is delivered through a delivery pipe 17 to a compressed air storage tank 18 that is kept at a constant pressure as determined by a regulating valve 19 that is set by turning a knob 20 and which is connected by a pipe 21 to the storage tank 18.

A hot water tank 22 is mounted on a supporting plate 23 and has a hot water inlet pipe 24 and outlet pipe 25. Within this tank 22 is a cheese hopper 26 that extends upwardly out of the upper end of the hot water tank 22 and has a cover 27 that is hinged to a bracket 28 on the upper end of the hopper. The cover is held in its closed position upon a sealing ring 29 by hinged thumb screw clamping devices 30 and 31. The cover has a handle 27' by which it is lifted. This hopper is tapered at its lower end as indicated at 32 and has a cylindrical discharge outlet end 33 in which a cutting and severing mold 34 is turned. The hopper and mold 34 for sanitary reasons are made of stainless steel.

The cheese is deposited in the upper end of the hopper 26 and is kept in workable condition by heat from the hot water surrounding the hopper 26 in the tank 22. This cheese is in mass formation and will be forced downwardly by compressed air through the hopper and into the cutting mold 34 intermittently as the cutting mold 34 is positioned to receive the charge.

The severing or cutting mold 34 is of hollow semi-spherical shape and open across its diameter to provide a thick blunt rolling, cutting or pulling edge 34' and a space 35 for receiving the cheese, Fig. 4. The cutting mold 34 is positioned as shown in Fig. 4, at the time the cheese is forced downwardly thereinto. This cutting mold is turned first one hundred and eighty degrees in one direction to cut the charge, pauses to discharge the cheese, and then one hundred and eighty degrees further in the same direction to return it to the cheese receiving position, as indicated by the arrows in Fig. 4. Thereafter, the cutting mold is turned one hundred and eighty degrees in the other direction to cut the charge, pauses to discharge the cheese and then one hundred and eighty degrees further to return it to the cheese receiving position. Secured to and extended from the driving end of the cutting mold is a shaft 36 that has a cam 37 with a lobe 38 thereon for engaging a roller follower 39 of an air valve 40. This shaft 36 is journaled in two bearings 41 and 42 depending from the underside of plate 23. A brake drum 43 is fixed to the shaft 36 and is frictionally resisted on being turned by a bar braking device 43' and adjusting screws 43a and 43b. On the shaft 36 are two pinion gears 44 and 45 respectively fixed to the shaft by respective set screws 46 and 47.

A stub shaft 48 extends from the opposite end of the cutting mold 34 and is journaled in a bearing 49 depending from the underside of the supporting plate 23. The shaft 36 extends through a vertical slot 33a in the discharge outlet 33 of the hopper 26 and through a vertical slot 33b at the opposite side thereof.

In mesh with the respective pinions 44 and 45 are driving gears 50 and 51. These driving gears are mutilated as shown in Fig. 6 and have blank spaces where there are no teeth so that while one gear is being operated to turn the cutting mold in one direction the other gear is inoperative. When the other gear is turned in the other direction, the one gear remains inoperative.

The gear 50 has gear formations 50a and 50b separated by a short space 50' and a long space 50". With the mold in the inverted position and the gear formation 50a engaging the small gear 44, the cutting or severing mold is moved into a filling or charging position such as shown in Fig. 4 to center the mold for receiving a charge of cheese. While the gear 50 is traveling through space 50' there is no movement upon the cutting mold and at this time the cam 37 will depress the roller 39 of the compressed air control valve 40 to deliver air to the top of the hopper and to force the cheese into the cutting mold. Thereafter, the gear formation 50b will engage the small gear 44 to continue the rotation in the direction of the arrow 52 so as to sever the cheese and to invert the mold to discharge the cheese ball.

The gear 51 has gear formations 51a and 51b separated by a small space 51' and a large space 51". The gear formation 51a will engage with the small gear 45 so as to return the cutting mold to the filling or charging position shown in Fig. 4 in the opposite direction from its inverted or discharge position. During the period of travel of the gear through the space 51', the cam 37 will operate the air valve 40 to again force the cheese into the mold 34. Thereafter, as the gear formation 51b engages the gear 45 the cutting mold is turned further in the direction indicated by the arrow 52' so as to sever the cheese from the other direction and to invert the mold so as to discharge the cheese ball. This operation continues. First one gear operates the cutting mold 34 and then the other gear operates the same. Each time the cutting operation is from an opposite direction. For each cycle, the cutting mold is turned through three hundred and sixty degrees. In order that the cheese will be easily dropped from the inverted cutting mold a plurality of air openings 35' are provided in the mold. This will rid the interior of the mold of vacuum which might tend to retain the cut cheese balls within the mold and will cause their quick ejection.

A pipe 57 delivers the air to the air valve 40 and upon the roller 39 being depressed the valve is opened so that this air will be delivered through a pipe 58 to the top of the hopper 26. The cheese will be forced downwardly into the interior of the mold at a predetermined pressure as determined by the setting of the regulating valve 19. Thereafter, the mold is turned to cut the mass and drop the cheese ball into a vessel 59 containing cold water to congeal the cheese so that the shape is maintained for further handling, curing, and packaging the cheese ball.

The gears 50 and 51 are respectively secured to shafts 62 and 63. The shaft 62 is journaled in spaced bearings 64 and 65 carried on a frame support 66. The shaft 63 is journaled in spaced bearings 67 and 68 which are also supported on the frame of the machine 66. Large gears 69 and 70 are respectively carried by the shafts 62 and 63 and are in mesh with one another so upon turning gear 70 by a pinion gear 71 the shafts 63 and 62 will be rotated in reverse directions. The gear 71 is connected through a coupling 72 to a drive shaft 73 of a reduction gear electric motor 74.

On the top of the hopper there is mounted a pressure gauge 75 in order that the air pressure in the hopper can be taken. Also there is provided on the upper end of the hopper an air bleed valve 76 for the hot water chamber so the chamber can be completely filled with hot water. A safety relief valve 77 is provided on the top of the hopper.

While various changes may be made in the detailed construction it shall be understood that such changes shall be within the spirit and scope of the present invention as defined by the appended claims.

What is claimed is:

1. A machine for forming cheese balls comprising a hopper having a discharge outlet end through which cheese may be discharged, a cutting or severing mold of substantially hollow semi-spherical shape having a blunt circular cutting edge and journaled for rotational movement in the outlet end of the hopper for rotation about an axis running through its diameter and parallel to the circular cutting edge of the mold, compressed air supply means for serving the hopper to force the cheese mass downwardly into the severing mold when the mold is in its cheese receiving position, and power operated means connected to the mold for alternately rotating said mold about its axis within the lower end of the hopper in opposite alternate direction first to sever the cheese ball from the cheese mass and to discharge the cheese ball and second to sever the cheese ball from the opposite direction and to discharge the second cheese ball therefrom.

2. A machine for forming cheese balls as defined in claim 1, and said cutting mold being of slightly less diameter than the internal diameter of the outlet end of the hopper to provide an air clearance therebetween, said cutting or severing mold having openings therein to conduct air entering through the air clearance space to the underside of the severed cheese ball to relieve the mold of vacuum that may tend to retain the cheese ball within the mold when the mold is inverted to discharge the cheese ball.

3. A machine for forming cheese balls as defined in claim 1, and said power operated rotating means for the mold including a power driven pinion gear, a pair of parallel shafts journaled on said machine, intermeshed timing gears on said shafts, one of said timing gears meshing with said pinion, whereby said shafts will be driven in opposite directions, a shaft extending from said cutting mold and having two pinion gears thereon, mutilated gears connected to the respective timing gear shafts in mesh with the respective pinion gears on the cutting mold shaft, whereby to intermittently rotate said cutting mold shaft first in one direction and then in the other direction and with a time lag space when the cutting mold is in its cheese receiving position and when in the cheese ball discharging position.

4. A machine for forming cheese balls as defined in claim 3, and compressed air means for delivering air under pressure to the top of said hopper, said compressed air means including a cam on said mold shaft and a time controlled valve operable by said cam thereby to automatically cause the insertion of the air into the hopper so as to force the cheese into the cutting mold after the mold has come to rest in its cheese receiving position.

5. A machine for forming cheese balls as defined in claim 1, and regulating means associated with the compressed air supply means for controlling the pressure of air delivered to the hopper whereby the weight of the cheese balls can be controlled.

6. A machine for forming cheese balls as defined in claim 1 and said compressed air supply means being operable in response to the operation of the rotating means for the cutting mold.

References Cited in the file of this patent

UNITED STATES PATENTS

| | | |
|---|---|---|
| 2,712,693 | Comparette | July 12, 1955 |
| 2,716,385 | Tarr | Aug. 30, 1955 |